Patented Sept. 19, 1922.

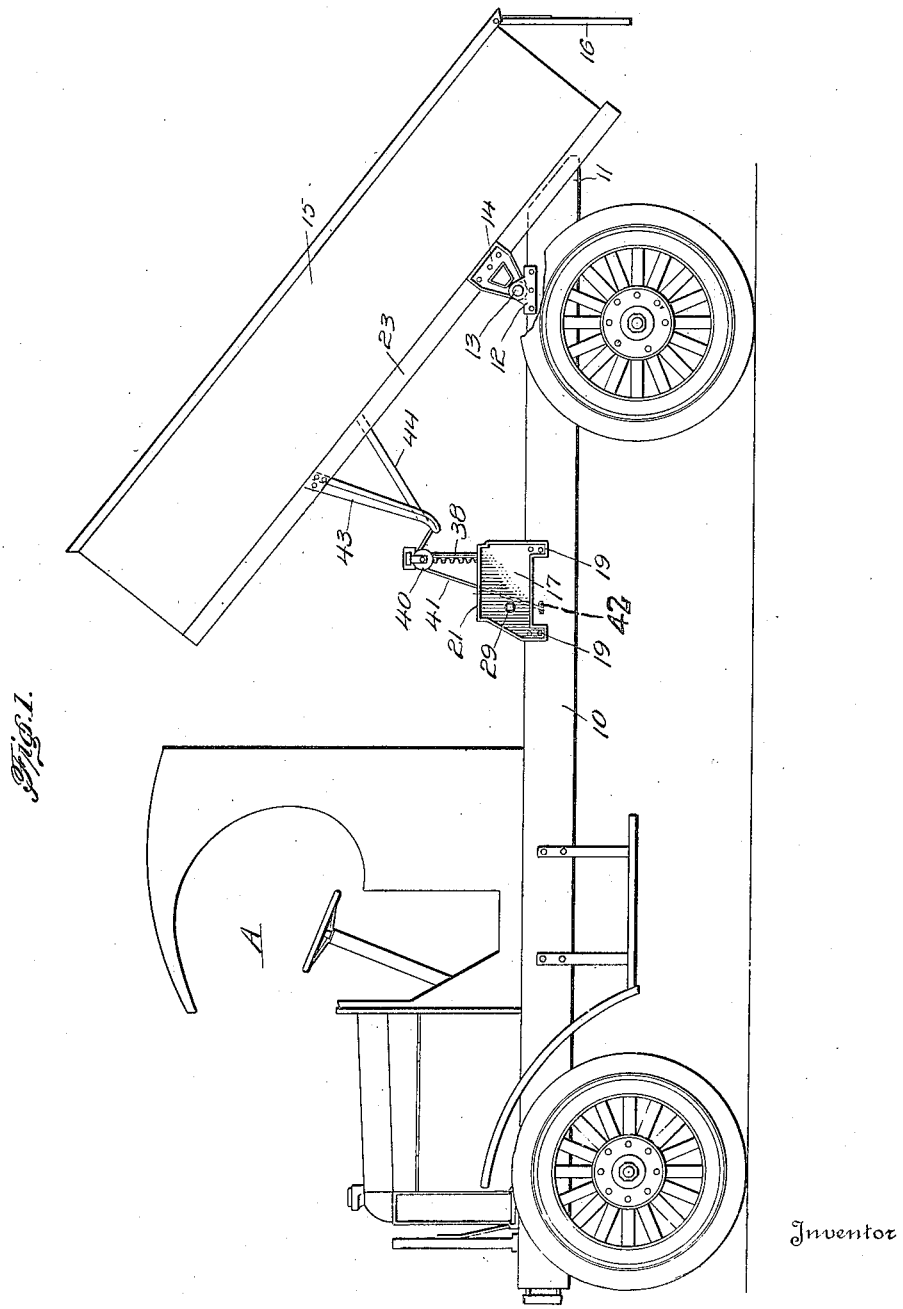

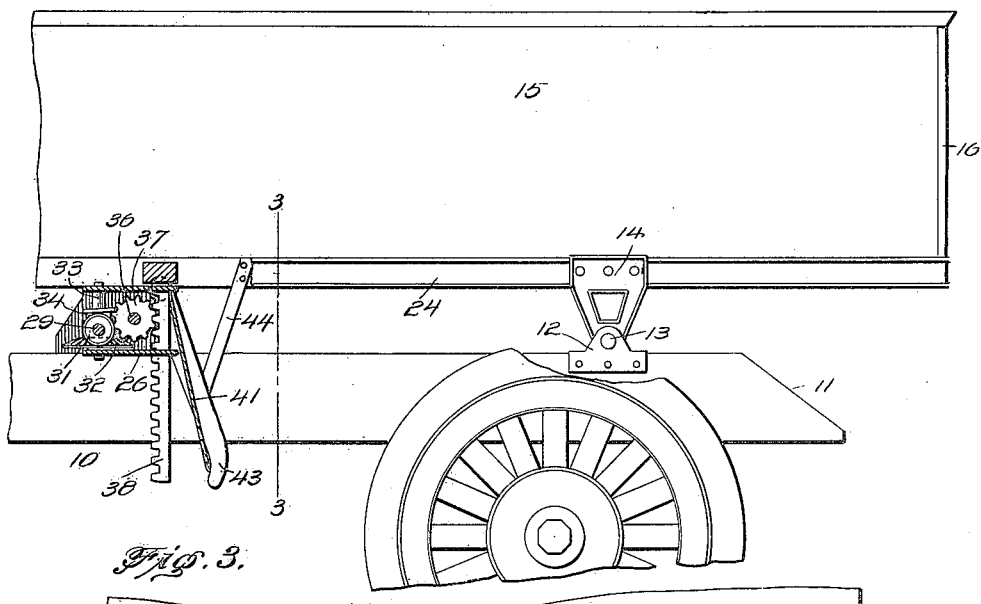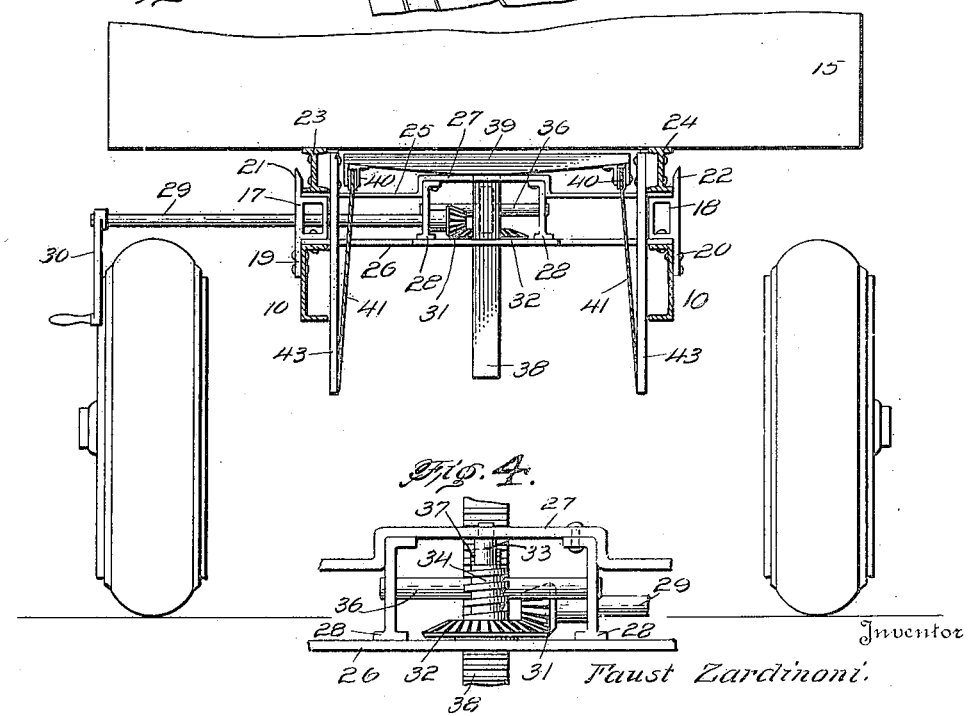

1,429,820

UNITED STATES PATENT OFFICE.

FAUST ZARDINONI, OF CHICAGO, ILLINOIS, ASSIGNOR OF ONE-HALF TO VINCENZO LO MONACO, OF CHICAGO, ILLINOIS.

DUMPING TRUCK.

Application filed May 23, 1921. Serial No. 471,709.

*To all whom it may concern:*

Be it known that I, FAUST ZARDINONI, a citizen of the United States, residing at Chicago, in the county of Cook and State of Illinois, have invented certain new and useful Improvements in a Dumping Truck, of which the following is a specification.

The invention appertains to certain improvements in dumping vehicles, and more particularly to the motor truck class of such vehicles.

The principal object of the invention is to provide for a mechanically refined construction and arrangement of dumping mechanism for the bodies of vehicles of the type specified, and of a nature particularly adaptable for application to vehicles of light weight construction, whereby to facilitate the operation of the dumping bodies thereof with the ease and rapidity comparable to the present known and larger truck and vehicle dumping mechanisms whether actuated manually or by a power means.

Another object of the invention is the provision of a truck of this character, wherein the load carrying body is supported for tilting movement, the chassis of said body being constructed in a novel manner, so that, when the body is brought to rear end tilting position, it can rest upon inclined portions of the chassis at the rear end thereof, and thus relieve, to a certain extent, the weight of the load from the axis on the tilting movement of said body.

Another object of the invention is the provision of a truck of the character mentioned, and one wherein the dumping body thereof, when in tilting position, enables through gravity action, the dislodging and complete discharge of a load from the body, the body being supported in a novel manner and the raising and lowering thereof being effected through the medium of a novel means, which is manually controlled by the operator of the truck.

A still further object of the invention is the provision of the truck of the type mentioned, and one which is comparatively simple in construction, thoroughly reliable and efficient in its purpose, and inexpensive to manufacture.

With the foregoing and other objects in view, the invention resides in the certain novel and useful construction and arrangement of parts as will be hereinafter more fully described, set forth in the appended claims, and illustrated in the accompanying drawing, in which:—

Figure 1 is a side elevation of the preferred embodiment of the invention, and showing the body of the vehicle in raised or dumping position, Fig. 2 is a fragmentary side elevation of the rear end portion of the vehicle showing the body thereof in its horizontal or loading position, Fig. 3 is a fragmentary vertical section taken on the line 3—3 of Fig. 2, and Figure 4 is a detail illustrating the gear for shifting the rack bar.

Referring to the drawings, wherein similar characters of reference designate corresponding parts in the several views thereof, A designates generally a dumping vehicle, preferably of the motor truck type, having its chassis 10 constructed and arranged to provide a rearwardly inclined end portion 11, and mounted on the opposite side bars of the chassis 10, in transverse alinement thereon, and inward of the rear inclined end portion 11 thereof, are a pair of bearings 12 in which is journaled the opposite ends of a dumping shaft 13, carried in bearing brackets 14 depending from and at opposite sides of the dumping body 15. This pivotal point of the body 15, or the journaling of the shaft 13 at or near the point as shown, provides for a major length of the dumping body to overlie the vehicle chassis 10 in a direction toward the forward end thereof, and for the rearwardly directed minor end portion of the body to extend outwardly from the rearwardly inclined end portion 11 of the latter, the rear end portion of the body being provided with an outwardly opening end gate 16 for the dumping of material therefrom, when the forward end of the body is raised and its rear end lowered.

Secured on the opposite side bars of the chassis 10, is a hoisting and lowering mechanism bracket which consists of end castings having substantially rectangular medial portions 17 and 18 resting on the upper faces of the chassis side bars, and depending flange portions 19 and 20 engaging the outer faces thereof, and secured thereto in any suitable manner, as by being riveted or bolted in position. The portions 17 and 18 are also provided with outer upstanding flanges 21 and 22, respectively, which act as guides for the bottom bars or reinforcing beams 23, and 24, of the dumping body 15, and for directing the same from and to normal position on the upper faces of the portions 17 and 18 of the bracket. Extending between and connecting the upper and lower faces of the medial portions 17 and 18 of the bracket are a pair of bars or plates 25 and 26, respectively, the upper bar or plate 25 being formed to provide an upwardly offset portion 27 medially of its length, and connecting the opposite ends of this offset portion 27 with the lower bar or plate 26 are a pair of spaced and vertically parallel bars or spacing braces 28. Journaled in the medial portion 17 of a bracket, extended at one side of the truck or vehicle, is a manually operable shaft 29, which has its outer end provided with a hand crank 30, and its inner end passed through the spacing brace 28, complemental to the portion 17, and carrying a beveled pinion 31 arranged in mesh with a beveled gear 32 keyed on a shaft 33 and journaled vertically of the upper and lower bars or plates 25 and 26. The shaft 33, immediately above the beveled gear 32, is provided with a worm 34 which is arranged in mesh with a worm gear 37 secured on a shaft 36 journaled horizontally between the spacing brace 28. The worm gear 37 is in mesh with a rack bar or dumping body jack 38. This rack bar or dumping body jack 38 is mounted for vertical movement through the upper and lower plates 25 and 26, and medially between the vertical spacing braces 28, and on the upper end of the same is disposed a transversely extending cross head 39 which is of a length to engage the under side of the dumping body 15 between its reinforcing bars or beams 23 and 24, and secured to the under side of the opposite ends thereof are a pair of sheaves or pulleys 40 over which are trained a pair of complemental flexible elements or cables 41, the latter being secured at one of their ends to the side bars of the chassis 10, as at 42, and at their other ends to the lower ends of a pair of oppositely and transversely spaced arms 43 depending from the under side of the dumping body, and are secured in such position to the reinforcing bars 23 and 24 thereof, the arms 43 being braced in proper position by means of suitable brace bars 44.

In the operation of this form of the invention, with the dumping body 15 in normally horizontal or loading position, and it is desired to raise the same to dumping position, the hand crank 30 is manipulated in the proper direction for the rotation of the shaft 29 and the beveled gear 31 carried thereby, which, in turn, rotates the vertical shaft 33 and the worm gear 34 thereon, through the medium of the beveled gear 32. Upon the rotation of the worm 34, it causes the actuation of the worm gear 37 causing the rack bar or dumping body jack 38 to move vertically of the bracket plates 25 and 26. During the upward movement of the rack bar or jack 38, the sheave or pulleys 40 effect a lifting pull on the cables 41 directly on their points of connection with the arms 43, and the body 15 is quickly raised to full dumping position, and at a faster rate than the upward movement of the rack bar or jack 38, and, as the rearward inclination of the body 15 increases, the tendency of the loaded material to move or gravitate toward the dumping end thereof, acts to aid in the dumping movement and to decrease the manual efforts to raise the rack bar or jack 38 to its fully raised position. In its fully raised position, the rear end portion of the body 15 is supported directly on the inclined end portion of the chassis 10, so that a goodly portion of the load strain of the body is taken off of the dumping shaft 13, and, when fully unloaded, the lowering of the forward end of the body 15, is greatly facilitated by the weight of the major forward end of the latter, by reason of the force of gravity acting thereon, so that very little manual effort need be exerted in the return movement of the body to normally horizontal or loading position.

By reason of the disposition of the axis or pivotal movement of the body, the force of gravity is exerted on the opposite ends of the body during its tilting movements in a manner to greatly facilitate the manual actuation of the dumping mechanisms, whereby to minimize the pivotal exertion on the part of the operator during either direction of tilting movement of the body, and it is obvious that the axis or pivotal point of the body may be located at any point on the chassis, other than as shown, so that the center of gravity may be varied to either side of such axis or pivotal point as may be desired.

It is of course understood that changes, variations and modifications, may be made in the invention such as fall properly within the scope of the appended claims without departing from the spirit of the invention or sacrificing any of its advantages.

Having thus fully described the invention, what is claimed is:—

1. In a wheeled vehicle having a chassis, of a rearwardly inclined rear end on the chassis, a dumping body carried by the chassis and mounted for tilting movement from a horizontal loading position to a rear end dumping position against the inclined rear end of the chassis, a bracket extending transversely of the chassis, a vertically movable rack bar carried by said bracket, a cross head carried at the upper end of said rack bar and extending transversely beneath said body, sheaves carried at the opposite ends of said cross head, arms depending from said dumping body, cables extending between the chassis and said arms and trained over said sheaves, and means for operating said rack bar for the actuation of said cables for the tilting of said body to and from normal horizontal loading position on the chassis.

2. In a vehicle a chassis, a dumping body pivoted thereon near the rear end thereof, a pair of arms depending from said dumping body, cables attached at one end to said arms and the other end to said chassis, a vertically movable element provided with a cross head arranged below the dumping body and supported by the chassis, sheaves carried by said cross heads and over which travel said cables, and operating means for said element.

In testimony whereof, I affix my signature hereto.

FAUST ZARDINONI.